United States Patent [19]

Fisher

[11] 4,270,777
[45] Jun. 2, 1981

[54] RELEASABLE HOSE FITTING

[75] Inventor: Charles K. Fisher, Belford, N.J.

[73] Assignee: TRW Inc., Cleveland, Ohio

[21] Appl. No.: 959,289

[22] Filed: Nov. 9, 1978

[51] Int. Cl.³ .............................................. F16L 33/22
[52] U.S. Cl. .................................... 285/242; 285/319; 285/DIG. 22
[58] Field of Search ....... 285/242, 243, 257, 238 (U.S. only), 285/DIG. 22, 319, 331, 259, DIG. 25; 174/65 R

[56] References Cited

U.S. PATENT DOCUMENTS

| 921,691 | 5/1909 | Friday | 285/319 X |
|---|---|---|---|
| 922,805 | 5/1909 | Nelson et al. | 285/DIG. 22 X |
| 2,123,889 | 7/1938 | Gleason | 285/331 X |
| 2,444,888 | 7/1948 | Baumgardner | 285/DIG. 22 X |
| 2,453,997 | 11/1948 | MacWilliam | 285/259 X |
| 3,210,101 | 10/1965 | Bahr | 285/331 X |
| 3,724,882 | 4/1973 | Dehar | 285/243 |
| 4,012,578 | 3/1977 | Moran et al. | 174/65 R X |

FOREIGN PATENT DOCUMENTS 2611233  9/1977  Fed. Rep. of Germany ........... 285/319

Primary Examiner—Thomas F. Callaghan
Attorney, Agent, or Firm—James R. O'Connor; Martin J. O'Donnell; Thomas C. O'Konski

[57] ABSTRACT

A releasable hose fitting comprises a male member that mounts on the end of a flexible hose and a complementary female member that mounts on a hose receiving nipple. The male member includes a pair of arms that extend along the side of the hose and that include inwardly projecting barbs that grip the hose walls to hold the member on the hose. The male member also includes a pair of relatively resilient wings that extend along the side of the hose and that include outwardly projecting noses. The female member has a cup-like configuration including a wall portion defining an entrance opening in which the male member is received. A locking rim is formed on the inside surface of the wall portion. As the male member is pushed into the female member, the wings deflect inwardly until the noses clear the rim, whereupon they snap outwardly and lock behind the rim. The male member is released from the female member simply by squeezing the wings inwardly sufficiently for the noses to clear the rim.

14 Claims, 11 Drawing Figures

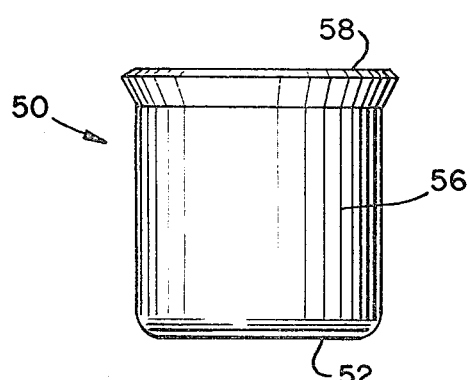
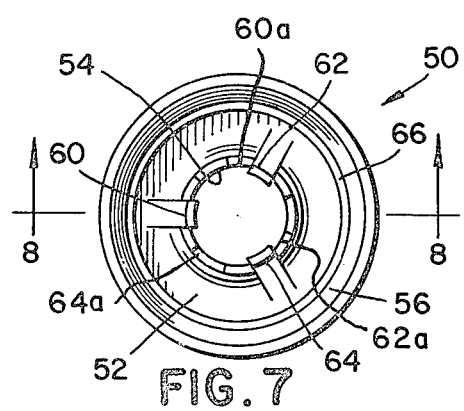
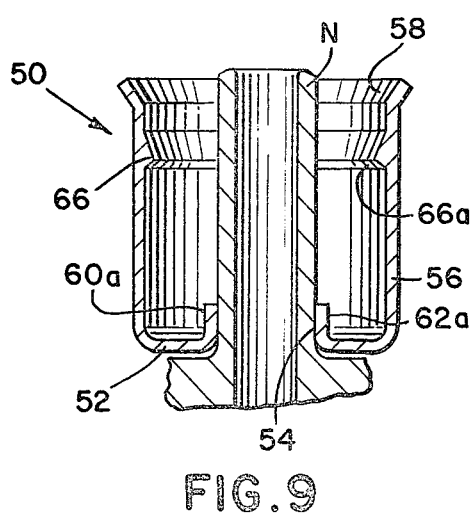
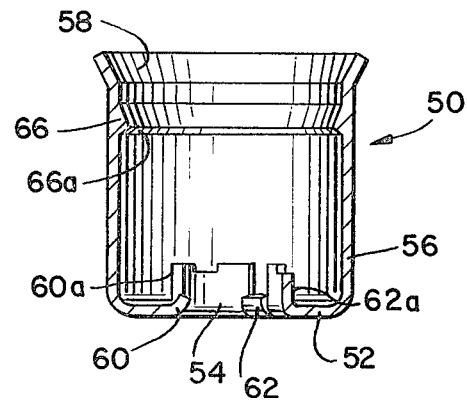
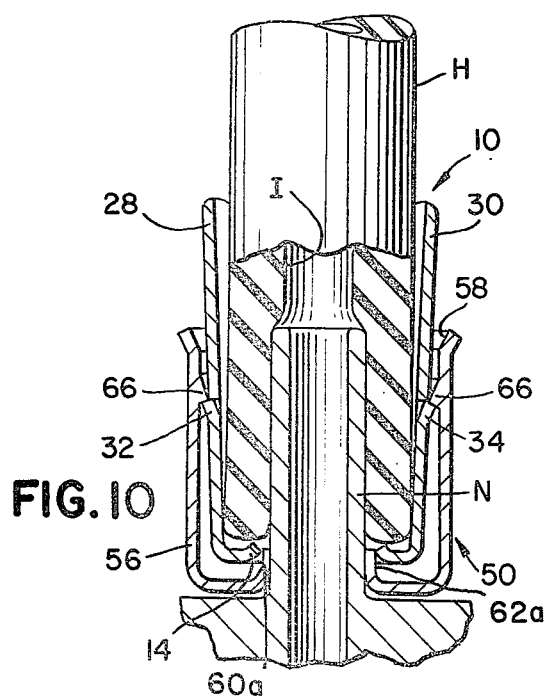
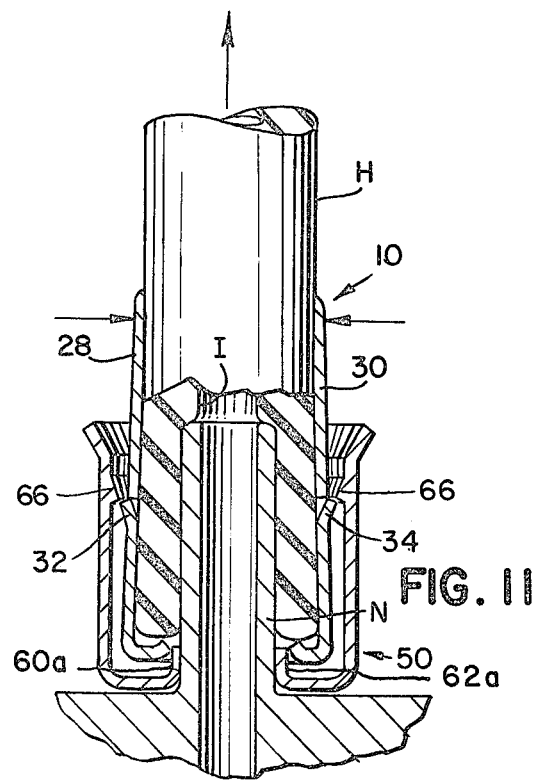

RELEASABLE HOSE FITTING

BACKGROUND OF THE INVENTION

This invention relates generally to hose fittings and, more particularly, to a fitting for flexible hoses which enables the hose to be snap-connected to a hose-receiving nipple, which securely retains the hose on the nipple under conditions of vibration and pressure development in the hose, and which enables the hose to be released from the nipple when desired by a relatively simple manipulation.

Flexible hoses are used in a variety of applications to conduct fluids between components. In the automotive field, for example, most modern day vehicles include gasoline engines that are equipped with anti-pollution equipment. Typically, this equipment comprises several interacting parts that are connected together, or to parts of the engine such as the carbuerator, distributor and the like, by small diameter flexible rubber hoses. It is important for the proper operation of the anti-pollution equipment and, in some cases, for the proper operation of the engine itself, that these hoses maintain their intended connections at all times during the use of the vehicle. It is equally important, however, that these hoses be readily removable from their connections when repairs to the anti-pollution equipment and/or the engine are to be made.

Prior arrangements for connecting flexible hoses to the operative parts of the anti-pollution equipment have typically involved design trade-offs between the retention and removal properties of the connection. In most prior designs, the part that receives the hose is equipped with a nipple which is dimensioned to fit within the internal channel of the hose. In some designs, a fastener, such as a screw-tightenable band or ring-shaped spring clip, is used to squeeze the hose against the inserted nipple and thereby to hold the hose in place. These designs are usually adequate in retaining the hose on the nipple in spite of engine vibration and high pressure development in the hose, but are disadvantaged because of the inconvenience involved in loosening or repositioning the fastener when the hose is to be removed from the nipple.

In other designs, no fastener is used, but the nipple is provided with peripheral ridges or barbs which grip the internal channel defining wall of the hose when the nipple is inserted. With the latter designs, the hose is usually easy to remove simply by pulling it from the nipple. However, hose manufacturing tolerances are such that the internal channel of the hose is sometimes too large for the nipple in which case the ridges or barbs are ineffective in gripping the hose. Also, through the process of removing and reinserting the hose on the nipple, the hose can stretch or split or material can be pulled from the internal wall of the hose to loosen the connection. Additionally, the hoses often become brittle with age, making it difficult for the nipple ridges or barbs to bite or grip the hose. As a result, the latter designs have experienced problems with the hose being vibrated or blown from the nipple.

There thus exists a need in the automotive field and in other fields utilizing flexible, fluid conducting hoses, for improved hose fittings that provide both secure retention and ready releasability when desired.

OBJECTS OF THE INVENTION

Accordingly, the present invention aims to provide an improved releasable fitting for flexible hoses.

Another object of the invention is to provide a fitting that enables a flexible hose to be snapped and locked in position on a hose receiving nipple.

Another object of the invention is to provide a fitting of the type described that enables the hose to be released for removal from the nipple by a simple hand squeezing and twisting motion.

Another object of the invention is to provide a fitting of the type described that can accommodate variations in the dimensions of the hose without affecting its ability to securely grip the hose and to retain the hose in position on the nipple.

Still another object of the invention is to provide a fitting of the type described that is economical to manufacture.

Other objects will, in part, be obvious and will, in part, appear hereinafter.

SUMMARY OF THE INVENTION

In accordance with an illustrative embodiment of the invention, a male fitting is provided which mounts to the end of a flexible hose to be retained on a hose-receiving nipple. The male fitting, which may be formed as a unitary component from a resilient material such as spring steel, includes an end portion that locates adjacent the end of the hose when mounted and that includes a central opening through which the internal channel of the hose is exposed. A pair of arms extend rearwardly from diametrically opposite positions of the end portion along opposite sides of the hose. Each of the arms includes one or more inwardly projecting barbs that can be pushed inwardly to grip the hose and thus hold the fitting on the hose. The arms are inwardly bendable and the barbs have sufficient inward extent to enable the fitting to accommodate variations in the diameter of the hose while still achieving a sufficient grip thereon to assure a secure attachment.

A pair of wings also extend rearwardly from diametrically opposite positions of the end portion between the arms. The wings are disposed at a slight outward angle so that each wing deviates outwardly somewhat from the sides of the hose. Each wing includes an outwardly projecting nose that defines a rearwardly looking surface and that tapers inwardly in the direction of the end portion of the fitting. Because of the resiliency of the fitting material, the wings can be deflected inwardly to bring the noses closer to the hose. However, upon release of the wings, they resiliently return to their normally spaced positions.

A complementary female fitting may also be provided which mounts to the hose-receiving nipple and which lockingly receives the male fitting. In accordance with an illustrative embodiment of the invention, the female fitting is a cup shaped unitary component including a base portion and a wall portion extending forwardly from the base portion that defines an entrance opening opposite the base portion. The base portion defines a central opening which enables the female fitting to be pushed onto the hose-receiving nipple with the wall portion of the fitting surrounding the nipple. The edges of the base portion defining the central opening are adapted to grip the nipple to prevent removal of the fitting once it is mounted thereon.

A locking rim is formed around the inside of the wall portion of the female fitting. The rim defines a relatively flat surface facing the base portion and is tapered in the direction of the entrance opening. As the end of the hose with the male fitting mounted thereto is pushed into the entrance opening of the female fitting, the nipple will pass through the opening in the end portion of the male fitting and into the internal channel of the hose. The projecting noses on the male fitting wings will also bear against the taper in the rim causing the wings to deflect inwardly toward the hose allowing the noses to pass the rim. When the noses clear the rim, the resilient wings snap outwardly and the noses engage behind the rim to lock the male fitting within the female fitting. The hose is thereby secured to the nipple and cannot be removed, vibrated or blown therefrom without further manipulation of the male fitting.

When the hose is to be removed from the nipple, the male fitting wings are simply gripped and squeezed together sufficiently for the noses to clear the rim. The male fitting and hose may then be pulled from the female fitting and nipple by a combined twisting and pulling motion.

The female fitting is unnecessary if the nipple itself is constructed with a surrounding wall portion which is engageable by the male fitting. The female fitting, like the male fitting, may be fabricated from spring steel in which case the locking rim may be formed simply by skiving material from the inside of the wall portion. The female fitting could also be fabricated from a plastic. With a plastic female fitting, the locking rim could be eliminated by making the projecting noses on the male fitting wings sharp enough that they bite into the wall portion when the wings are released to prevent its removal.

BRIEF DESCRIPTION OF THE DRAWINGS

The foregoing and other objects, features and advantages of the invention will be better understood from the following detailed description taken in conjunction with the accompanying drawing in which:

FIG. 6 is a side view of a female fitting embodying the invention which is adapted to fit over and grip a hose-receiving nipple;

FIG. 7 is an end view looking into the entrance opening of the female fitting of FIG. 6;

FIG. 8 is a side view in section of the female fitting of FIG. 6 and 7 with the section being taken along the plane labelled 8—8 in FIG. 7;

FIG. 9 is a side view in section similar to the view of FIG. 8 but showing the female fitting mounted to the nipple;

FIG. 10 is a side view in section showing the male fitting of FIGS. 1 and 2 lockingly received within the female fitting of FIGS. 6 and 7 and with the hose received over the nipple; and FIG. 11 is a side view in section similar to view of FIG. 10 but showing wings on the male fitting squeezed together for the purpose of removing the male fitting and hose from the female fitting and nipple.

DETAILED DESCRIPTION OF ILLUSTRATIVE EMBODIMENT

Figure 1:
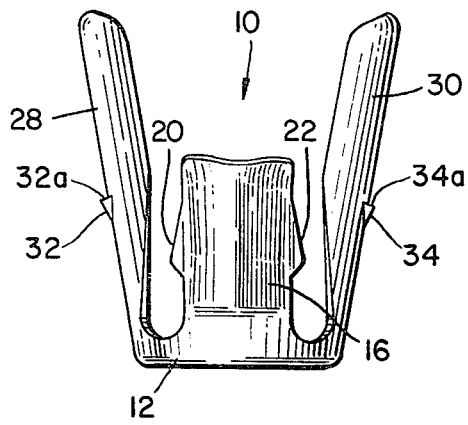
FIG. 1 is a side view of a male fitting embodying the invention which is adapted to fit over and grip the end of a flexible hose.
Figure 2:
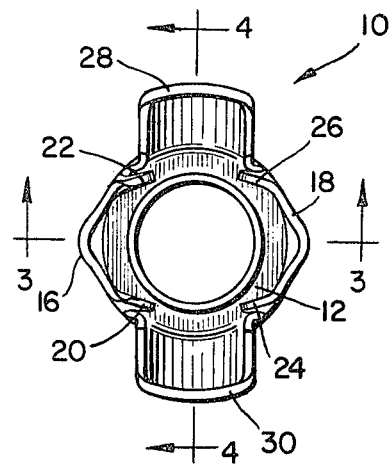
FIG. 2 is an end view of the male fitting of FIG. 1.
Figure 3:
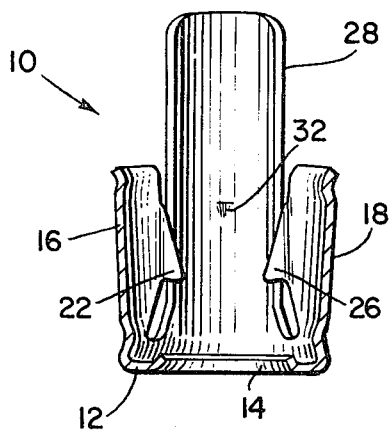
FIG. 3 is a side view in section of the male fitting of FIGS. 1 and 2 with the section being taken along the plane labelled 3—3 in FIG. 2.
Figure 4:
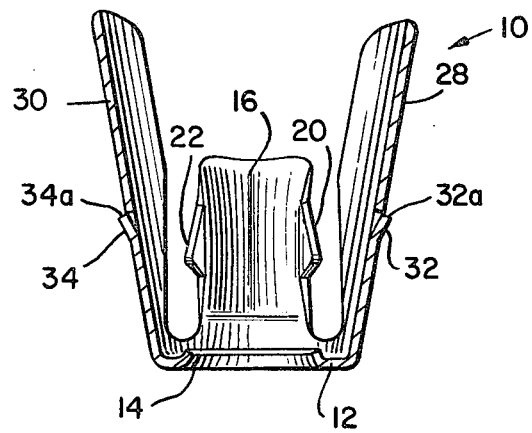
FIG. 4 is a side view in section of the male fitting of FIGS. 1 and 2 with the section being taken along the plane labelled 4—4 in FIG. 2.

Referring now specifically to the drawing, and initially to FIGS. 1 through 4 thereof, there is shown a male fitting member 10 embodying the invention. As noted, the member 10 is preferably fabricated as a unitary component from a resilient material such as spring steel. The member 10 includes a generally circular end portion 12 defining a central opening 14. As best seen in FIGS. 3 and 4, the edge of the end portion 12 that defines the opening 14 is bent inwardly so as to define a tapered opening. As will be appreciated more fully from the description below, the tapered opening 14 helps guide a hose receiving nipple into alignment for insertion within the internal channel of a hose to which the member 10 has been mounted. The edge of the end portion 12 that defines the tapered opening 14 also serves to stiffen and stabilize the male fitting member 10 relative to the female fitting member 50 in the hose connection which is described in detail hereinafter.

A pair of arms 16 and 18 extend rearwardly from opposite sides of the end portion 12. Each arm 16 and 18 is bent or creased so as to follow generally the contour of the sides of the end portion 12. This bending or creasing helps stiffen the arms 16 and 18 against inward and outward deflection. Also, each arm 16 and 18 includes a pair of laterally spaced, inwardly projecting barbs 20/22 and 24/26, respectively. Each of the barbs 20, 22, 24 and 26 terminate in a slightly radiused point facing the end portion 12.

A pair of wings 28 and 30 also extend rearwardly from opposite sides of the end portion 12 between the arms 16 and 18. As can be appreciated from the drawing, the wings 28 and 30 are longer than the arms 16 and 18 and also deviate outwardly at a slight angle from the central axis of the member 10. As compared to the arms 16 and 18, the wings 28 and 30 are relatively deflectible inwardly toward the axis of the member 10. However, because of the resiliency of the material from which the member 10 is preferably fabricated, the wings 28 and 30, when released, resiliently return to their normal outward spacing.

Each wing 28 and 30 carries an outwardly projecting nose 32 and 34, respectively. The noses 32 and 34 define a relatively flat surface 32a and 34a, respectively, facing away from the end portion 12 and taper inwardly in the direction of the end portion 12. As is best seen in FIGS. 3 and 4, the noses 32 and 34 may be formed by stamping an integral tab from the wall material defining each wing 28 and 30.

Figure 5:
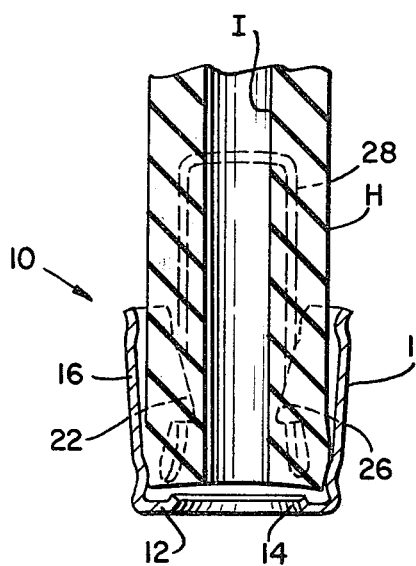
FIG. 5 is a side view in section similar to the view of FIG. 3 but showing the male fitting mounted to the hose.

FIG. 5 of the drawing shows the male fitting member 10 mounted to a flexible (e.g., rubber) hose H. The hose H defines an internal axial channel I through which fluid (e.g., air under pressure) is conducted. As can be appreciated from FIG. 5, the hose H is disposed between the arms 16 and 18 with the end of the hose H adjacent the end portion 12 of the member 10. The opening 14 in the end portion 12 exposes the internal channel I of the hose H. Prior to mounting the member 10 to the hose H, the arms 16 and 18 may be bent outwardly somewhat away from the axis of the member 10 to facilitate the insertion of the hose H. With the hose H inserted, the arms 16 and 18 pinch inwardly so that the barbs 20, 22, 24 and 26 grip the walls of the hose H and gather hose material in front of them. The barbs 20, 22, 24 and 26 together with the relative stiffness of the arms 16 and 18 assure a firm and secure attachment of the member 10 to the hose H. If necessary, however, the member 10 can be removed from the hose H, for replacement by another fitting member 10, by bending the arms 16 and 18 outwardly sufficiently for the barbs 20, 22, 24 and 26 to release the hose H.

As can be appreciated, because of the considerable inward extent of the barbs 20, 22, 24 and 26 and because of the bendability of the arms 16 and 18, the member 10 can accommodate relatively large tolerances in the outside diameter of the hose H without affecting its ability to achieve a firm grip on the hose H. Obviously, the arms 16 and 18 need to push inwardly only to the extent necessary for the barbs 20, 22, 24 and 26 to obtain a sufficient grip on the hose H.

FIGS. 6, 7 and 8 of the drawing show a complementary female fitting member 50 embodying the invention. Like the male member 10, the female member 50 may be fabricated from spring steel. The female member 50 has a cup-like configuration including a generally circular base portion 52 defining a central opening 54 and a generally circular wall portion 56 extending from the edge of the base portion 52 and defining an entrance opening 58 opposite the base portion 52. The edge of the wall portion 56 defining the entrance opening 58 is outwardly flared to facilitate the insertion of the male member 10 therein.

As shown in FIG. 9, the female member 50 is adapted for mounting to a hose-receiving nipple N which is dimensioned to fit within the internal channel I of the hose H. To secure the female member 50 on the nipple N, the base portion 52 includes a plurality of (e.g., three) gripping tabs 60, 62 and 64 which project into the opening 54 and define relatively sharp edges that grip the nipple N and prevent the member 50 from being pulled from the nipple N once it is mounted thereon. Between the gripping tabs the female member is provided with three longer upstanding stabilizing tabs 60a, 62a and 64a which, as seen in FIGS. 9, 10 and 11 lay up against the outer surface of the nipple N to stabilize, i.e., preventing rocking or tipping of the female member relative to the nipple. With the female member 50 mounted, the free end of the nipple N is adjacent the entrance opening 58 and the wall portion 56 surrounds the nipple N.

The wall portion 56 of the female member 50 includes a locking rim 66 extending inwardly from its inside surface. The rim 66 cooperates with the noses 32 and 34 on the wings 28 and 30 of the male member 10 in holding the male member 10 within the female member 50. As can best be appreciated from FIGS. 8 and 9, the rim 66 defines a relatively flat surface 66a facing toward the base portion 52 and tapers in the direction of the entrance opening 58. For the case of a spring steel member 50, the rim 66 can be formed by skiving material from the inside of the wall portion 56 using a suitable skiving tool.

Once the male member 10 is mounted to the end of the hose H as shown in FIG. 5 and the female member 50 is mounted to the nipple N as shown in FIG. 9, the male member 10 may be pushed into the entrance opening 58 of the female member 50. The free end of the nipple N passes through the tapered opening 14 in the end portion 12 of the male member 10 and into the internal channel I of the hose H. The tapers of the noses 32 and 34 bear against the taper in the rim 66, causing the wings 28 and 30 to deflect inwardly toward the hose H. Once the noses 32 and 34 are pushed past the rim 66, the wings 28 and 30 resiliently snap outwardly again, in which case the surfaces 32a and 34a on the noses 32 and 34 bear against the surfaces 66a on the rim 66 to lock the male member 10 within the female member 50.

FIG. 10 of the drawing illustrates the male member 10 fully inserted and locked within the female member 50. As can be appreciated from FIG. 10, the wall portion 56 of the female member 50 is preferably dimensioned so that the wings 28 and 30, in the locked position, can not return to their normal undeflected outward positions. There is, as a result, a certain degree of outward pre-loading of the noses 32 and 34 against the rim 66 which improves the grip of the male member 10 on the female member 50 and which prevents the male member 10 from being vibrated, blown or inadvertently knocked from the female member 50. One can also readily observe in FIG. 10 how the edge portion 12 defining the tapered opening 14 in the male fitting member bears against the outer surfaces of the stabilizing tabs 60a, 62a, 64a of the female member 50 to stiffen and stabilize the male fitting relative to the female fitting.

FIG. 11 shows the male member 10 in the process of being removed from the female member 50. Removal is accomplished quite simply by gripping the wings 28 and 30 and squeezing them inwardly against the hose H so that the noses 32 and 34 clear the rim 66. The male member 10 may then be removed from the female member 50 by a combined pulling and twisting motion to disconnect the hose H from the nipple N.

It should now be appreciated that, unlike prior hose fittings using screw tightenable bands or spring clips, the fitting members 10 and 50 are easy to connect and release. Unlike prior fittings that utilize a ribbed or barbed nipple to bite the inside of the hose H, the members 10 and 50 can be connected and released and reconnected repeatedly without affecting the ability of the members to achieve a secure connection.

In one specific illustrative embodiment of the invention, the members 10 and 50 are dimensioned for use with ⅜ inch outer diameter rubber hose of the type used in automotive anti-pollution equipment. The members 10 and 50 are fabricated from 50 carbon spring steel of about 0.010 inch and 0.018 inch in thickness respectively. departing from the scope of the invention as defined by the appended claims. For example, it should be apparent that if the hose-receiving nipple N itself is designed with a surrounding wall portion similar the wall portion 56 of the female member 50, then the female member 50 is unnecessary. Also, while spring steel has been mentioned as the preferred material for the members 10 and 50, they could also be fabricated from other materials such as plastic. If the female member 50 is formed of a relatively deformable material such as plastic, the rim 66 could be eliminated provided the noses 32 and 34 are sharp enough to bite into the wall portion 56 of the female member 50 to hold the male member 10 in place. It is thus the object of the appended claims to cover these and other modifications as come within the true scope of the invention.

What is claimed as new and desired to be secured by Letters Patent of the United States is:

1. A fitting for releasably securing a flexible hose defining an internal channel to a hose-receiving nipple dimensioned to fit within the channel, said fitting comprising:

A. a male fitting member for mounting to an end of the hose and including
   i. an end portion defining an opening therethrough for mounting adjacent the end of the hose, said opening being adapted to expose the hose channel,
   ii. means for gripping the hose and for retaining said male fitting member on the hose, and
   iii. a pair of relatively resilient, inwardly deflectible wings projecting from said end portion for extending along the sides of the hose, each of said wings including outwardly projecting locking means; and
B. a female fitting member formed as a unitary component from a resilient material for mounting to the hose-receiving nipple and including
   i. a base portion defining an opening therethrough for receiving the nipple,
   ii. means for retaining the female fitting member on the nipple, and
   iii. a wall portion projecting from said base portion for surrounding the nipple, said wall portion defining an entrance opening opposite said base portion;
whereby when said male fitting member is inserted within said female fitting member, the nipple is received within the hose channel and said locking means resiliently grip said wall portion to secure the hose on the nipple, and whereby said male fitting member is releasable from said female fitting member by deflecting said wings inwardly toward the hose to disengage said locking means from said wall portion.

2. The fitting of claim 1 wherein said hose gripping means of said male fitting member comprise a pair of relatively stiff arms projecting at spaced positions from said end portion for extending along the sides of the hose, each of said arms including at least one inwardly projecting barb for gripping the hose to retain the male fitting member on the hose.

3. The fitting of claim 2 in which each of said arms includes a pair of barbs that project inwardly from laterally spaced positions thereof for gripping the hose to retain the male fitting member on the hose.

4. The fitting of claim 2 in which said wings extend from diametrically opposed positions on said end portion and in which said arms also extend from diametrically opposed positions on said end portion between said wings.

5. The fitting of claim 2 in which said wings extend from said end portion to a greater length than said arms.

6. The fitting of claim 1 in which said wings extend at a slight outward angle from said end portion so as to deviate outwardly from the sides of the hose.

7. The fitting of claim 1 in which said locking means on said wings comprise a nose projecting outwardly from each of said wings, each of said noses defining a relatively flat surface facing away from said end portion and a sloping surface tapering inwardly in the direction of said end portion.

8. The fitting of claim 1 in which said male fitting member is formed as a unitary component from a resilient material.

9. The fitting of claim 8 in which said male fitting member is formed as a unitary component from spring steel.

10. The fitting of claim 1 wherein said wall portion of said female fitting member includes a rim extending inwardly from the inside of said wall portion, said locking means on said male fitting member wings being adapted to engage behind said rim when said male fitting member is inserted within said female fitting member to lock said two members together.

11. The fitting of claim 1 in which said retaining means of said female fitting member comprise integral tabs extending from said base portion toward said opening for gripping the nipple.

12. The fitting of claim 1 in which the edge of said female fitting member defining the entrance opening is outwardly flared to facilitate the insertion of said male fitting member therein.

13. The fitting of claim 1 in which said female fitting member is formed as a unitary component from spring steel.

14. The fitting of claim 1 in which said female member further includes stabilizing elements which bear against the outer surface of the nipple when the female member is mounted thereon to inhibit canting of the female member relative to the nipple.

* * * * *